Oct. 24, 1933.  W. R. WILLETT ET AL  1,931,519
COTTON PICKER
Filed Oct. 10, 1930  3 Sheets-Sheet 2

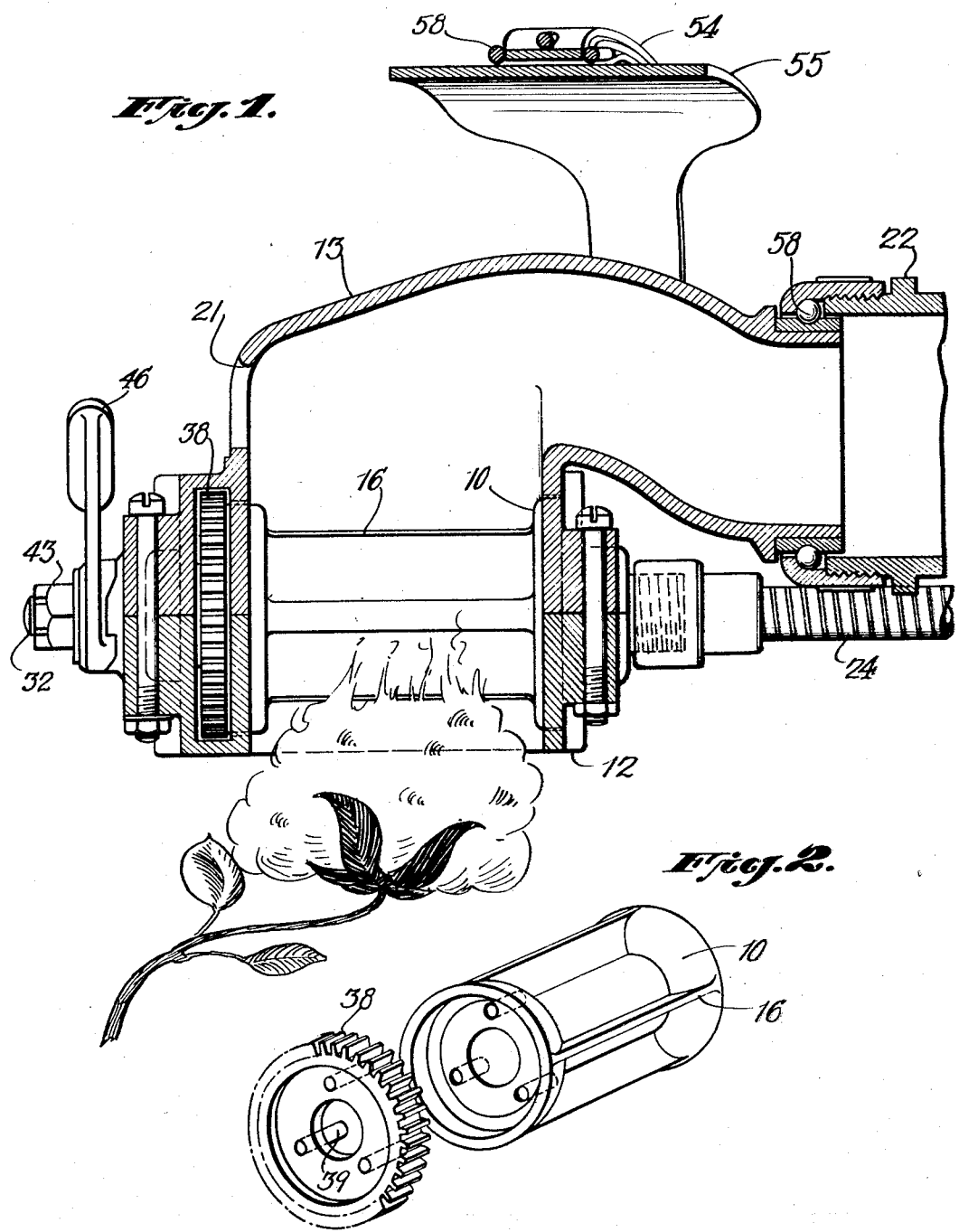

Inventors
WALLACE R. WILLETT.
HARVEY E. BROWN.
By Their Attorneys

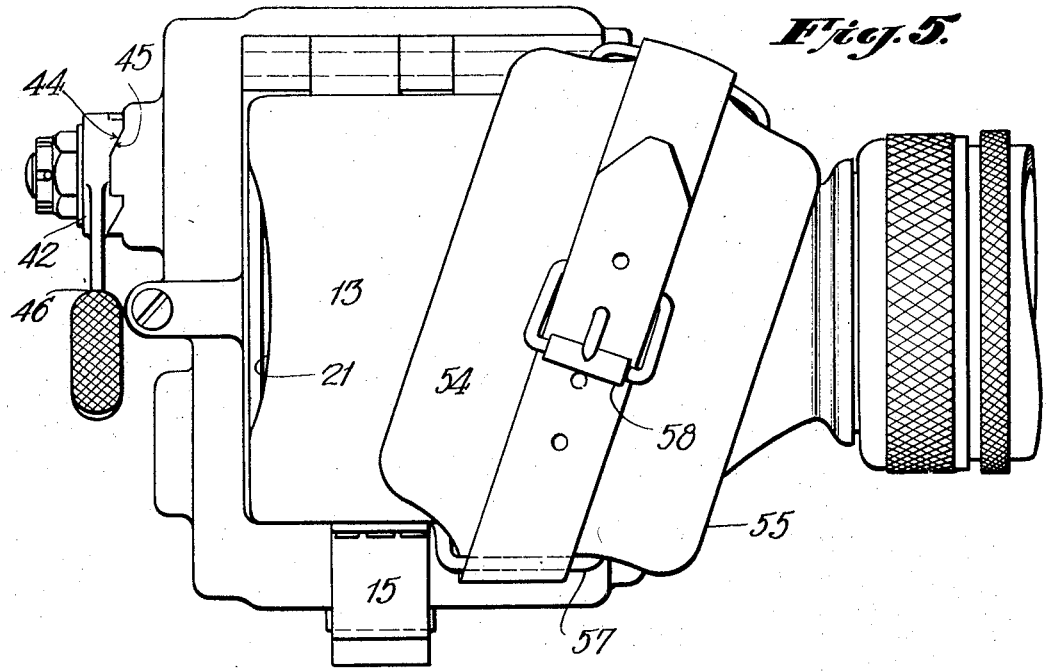
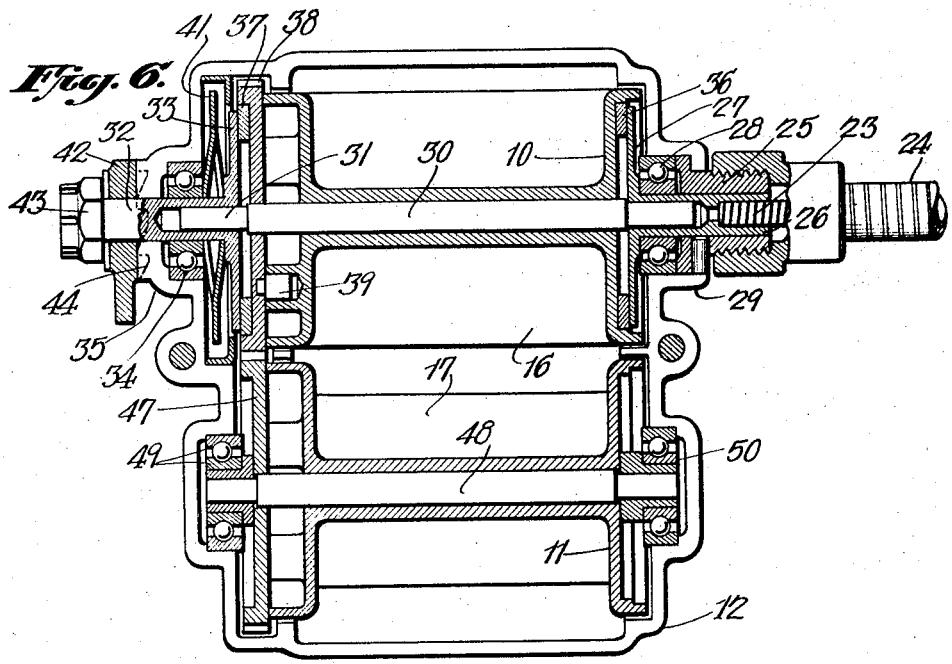

Patented Oct. 24, 1933

1,931,519

UNITED STATES PATENT OFFICE 1,931,519

COTTON PICKER

Wallace R. Willett, New York, N. Y., and Harvey E. Brown, St. Louis, Mo., assignors to American Cotton Picker Corporation, St. Louis, Mo., a corporation of Delaware Application October 10, 1930. Serial No. 487,657

18 Claims. (Cl. 56—32)

This invention relates to a cotton picker device and more particularly to a device for mechanically detaching the lock or tuft of cotton fibers from the stalk and boll and delivering the detached lock of fibers to a conveyer means or conduit for delivery to a collector or receptacle.

The objects of the invention are to provide a cotton picker device of the above type that will cleanly and quickly detach the lock from the boll and stalk without detaching the boll or petals; to provide a cotton picker device that will not clog and that may be quickly opened and closed; to provide a cotton picker mechanism that may be easily and quickly started and stopped and that does not entangle, break or otherwise injure the fibers of the lock; and moreover to provide a cotton picker device that is safe and flexible in operation and that is not liable to get out of order.

Other objects of the invention will more fully appear from the description in the following specification and in the illustration of a preferred embodiment of the invention as shown in the accompanying drawings, in which Fig. 1 is a longitudinal view partly in section of a cotton picker embodying the invention.

Fig. 2 is a perspective view of a cotton picker element and driving gear shown in displaced relation.

Fig. 5 is a top or plan view and

Fig. 6 is a sectional view taken on line 6—6 of Fig. 3.

Figure 3:
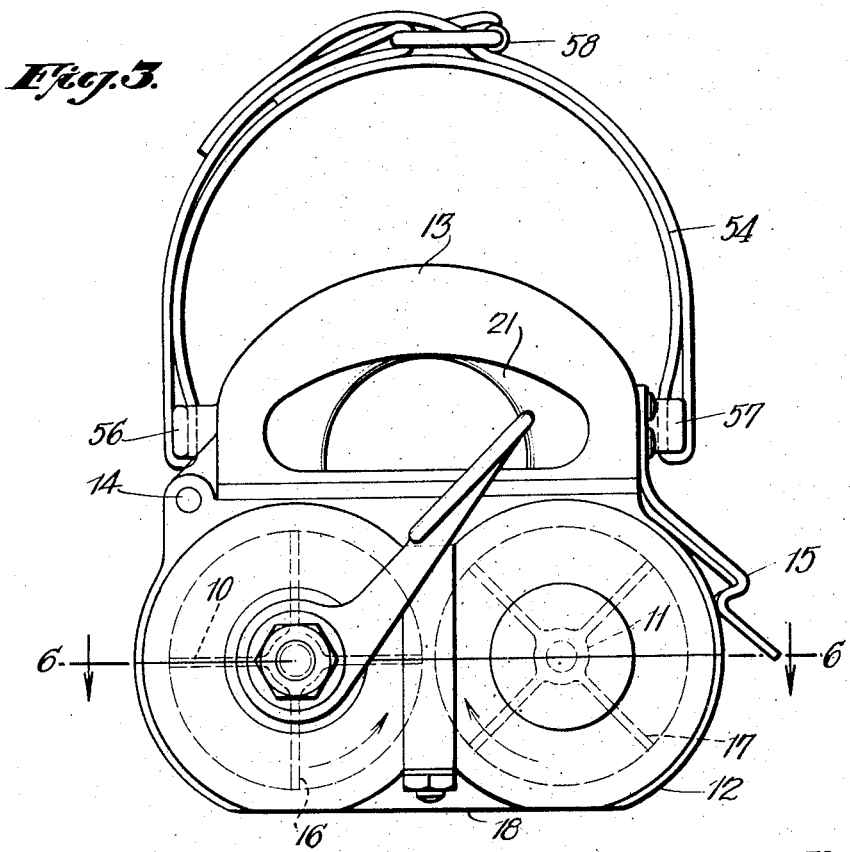
Fig. 3 is a front end view of the picker device.
Figure 4:
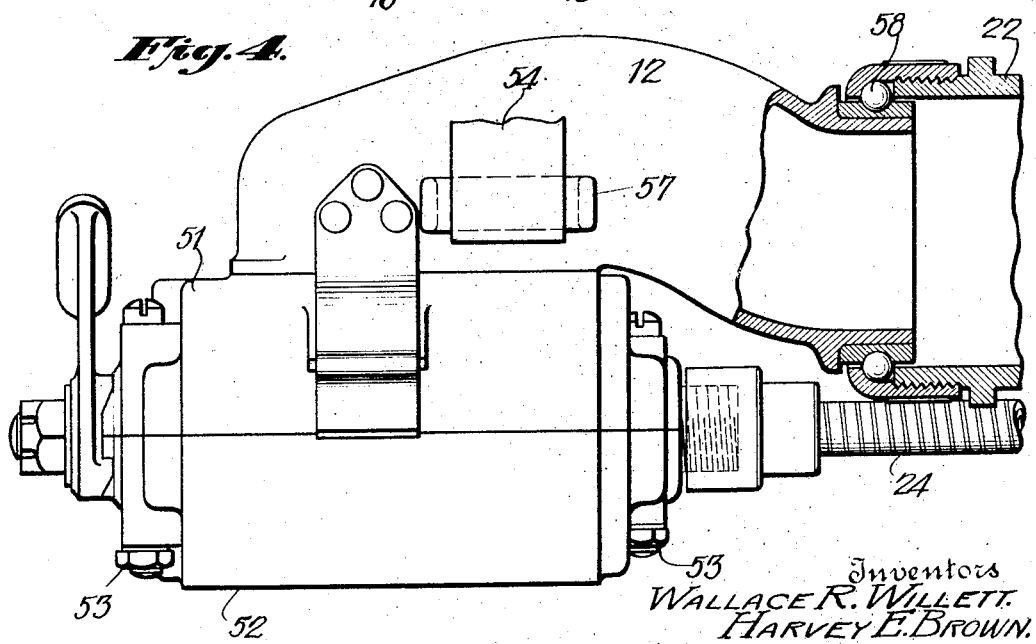
Fig. 4 is a side view of the device.

In our invention the lock of cotton fibers is detached and delivered or propelled into a conveyer tube by means of a pair of rotating spools or cylinders having smooth edged vanes and rotated in opposite directions and at such a speed that the surface of the lock is brushed by the edges of the vanes into the receiving end of a suction tube. The spools or cylinders are arranged on parallel axes, the vanes projecting radially and being so arranged that the vanes on one spool passes intermediate or midway of the vanes on the other as the spools are rotated so that there is no contact of the vanes and always a considerable space between the edges of the vanes. The spools are rotated in opposite directions and at equal speeds, being geared together for this purpose. The spools are rotated from a drive shaft through a clutch that engages one of the spools or its driving gear. This clutch is normally pressed into engagement by a spring, but may be released by a cam and lever arrangement at the front of the picker device.

The rotating picker elements are mounted in a housing that is hinged to the receiving chamber of the conveyer structure so that it may be swung free therefrom giving access to both sides of the picker element and to the interior of the conveyer chamber. When the detached lock is propelled to the conveyer chamber by the rotating spools it is picked up by a draft of air which enters the front of the conveyer chamber, and is carried through a conveyer tube to a receiving bag or receptacle.

Referring more particularly to the accompanying drawings, a pair of spools 10 and 11 are mounted in parallel positions lengthwise of a housing 12 which is secured to a conveyer chamber 13 by means of a hinge 14 and a snap latch 15. The spools or cylinders 10 and 11 have radial vanes 16 and 17 respectively, four vanes being shown by way of example, and the spools are so arranged that the vanes 16 of the spool 10 are at angles intermediate those of the vanes 17 of the spool 11, being at an angle of 45 degrees to the vanes 17 when four vanes are used as in the embodiment shown in the accompanying drawings. The spools 10 and 11 are rotated in the directions shown by the arrows in Fig. 3 so that the edges of the vanes 16 and 17 travel inwardly and upwardly towards the chamber 13. The lower side of the housing 12 is open as at 18 so that the edges of the rotating vanes 16 and 17 may be brought into contact with the surface of a lock of cotton 19. The rapid sweep of the edges of the vanes 16 and 17 over the surface of the cotton lock instantly brushes the lock upwardly between the rotating spools, thus detaching it from the petals or boll 20 and throwing it into the chamber 13.

A draft of air is drawn through an opening 21 in the forward end of the chamber 13 and, engaging the detached lock 19, sweeps it into a conveyer tube 22 leading to a receiving bag or receptacle.

The spools 10 and 11 are driven from a flexible drive shaft 23 enclosed in a flexible tube 24, the front end of which tube is threaded onto a boss 25 projecting from the rear end of the housing 12. The front end of the flexible drive shaft 23 is threaded into the hub 26 of a rear clutch 27 that is journalled in ball bearings 28 in a collar 29 projecting rearwardly from the housing 12. A spindle 30 extending through the hollow hub of the spool 10 is secured in the clutch 27 and is freely rotatable relative to the spool 10. The front end 31 of the spindle 30 is squared and is received in a hub 32 of a front clutch 33. The clutch 33 is journalled in ball bearings 34 in a collar 35 projecting forwardly from the housing 12. The clutch 27 is provided with a friction ring 36 positioned to lie adjacent the rear face of the spool 10. The front clutch 32 is similarly provided with a friction ring 37 that is positioned to lie against the side face of a gear 38 which, in turn, is adjacent to the front face of the spool 10 and is provided with rearwardly projecting pins 39 that are received in sockets 40 in the front face of the spool 10 so that the gear 38 and the spool 10 are in fixed rotational engagement. The clutch 33 is resiliently pressed against the front face of the spool 10 by means of a circular spring 41 confined between the clutch 33 and the rotating element of the ball bearing 34.

The spring 41 serves to press the clutch 33 and friction ring 37 against the front face of the gear 38 and to press the gear 38 and spool 10 against the friction ring 36 and clutch 27, the spool being freely slidable and rotatable on the spindle 30. The spool 10 is thus rotated from the shaft 23 through the rear and front clutches 27 and 33. To release the clutches a ring 42 is mounted on and secured to the projecting end of the hub 32 of the clutch 33 by means of a nut 43, and is provided with a series of saw tooth or cam teeth 44 that fit complementary cam teeth 45 on the projecting collar 35. The hub 32 of the clutch 33 is freely rotatable relative to the cam ring 42.

The ring 42 is provided with a lever 46 which may be depressed, thereby rotating the ring 42 and causing the latter to be displaced forwardly, drawing with it the clutch 33 against the action of the spring 41 and releasing the clutch 33 and the clutch 27 from the spool 10. The spool 11 is driven from the gear 38 by means of a gear 47 that meshes with the gear 38 and is mounted on a spindle 48 that extends through the hollow hub of the spool 11 and is mounted in forward and rear ball bearings 49 and 50. The gear 47 is provided with rearwardly projecting pins that extend into the forward face of the spool 11 in a manner similar to those of the gear 38.

It will be apparent from the above arrangement that the spools 10 and 11 are always driven in opposite directions and at equal speeds, the rotation being in the direction indicated by arrows in Fig. 3.

The housing 12 may be of any suitable construction being preferably made in upper and lower halves 51 and 52 connected by bolts 53 so that upon the removal of the latter the spools 10 and 11 and their supporting elements may be readily removed and replaced.

In operating the apparatus the operator's hand is positioned with the palm on the upper surface of the chamber 13 and with the fingers projecting forwardly in position so that they may quickly and easily press the lever 46. The hand is secured in proper position by means of a strap 54, and a leather plate or pad 55, secured in an oblique position, as indicated in Fig. 5, to eyelets or loops 56 and 57 at the opposite sides of the chamber 13. The strap 54 may be tightened by means of a suitable buckle 58. With this arrangement the chamber 21 and the housing 12 are in convenient position to be brought into contact with a cotton lock, the rear end of the housing 12 being connected to the conveyer tube 22 by a frictionless or ball bearing socket connection 58 that permits the chamber 13 and its associated housing 12 to be readily turned in any direction.

In operating the device the spools 10 and 11 are set in very rapid rotation by means of the drive shaft 24 and the open end 18 of the housing 12 is swept over or brought into contact with the upper surface of the cotton lock 19, whereupon the rapid and opposite brushing action of the vanes 16 and 17 detach the lock and sweep it into the chamber 21, whereupon it is instantly drawn rearwardly by the draft of air drawn through the opening 21. The current of air is not, however, relied upon for detaching or picking the boll. The edges of the vanes 16 and 17 are smooth and do not entangle or engage the fibers of the cotton lock, nor do they grip or clamp the lock, there being sufficient room between the inter-leaved vanes 16 and 17 for the lock to pass freely into the chamber 13. Should the chamber 13 become clogged for any reason, the latch 15 may be opened and the housing 12 freely swung out of position on the hinge 14, giving free access to the interior of the chamber 13 and to the delivery side of the spools 10 and 11. Thereupon a quick turn will cause the housing 12 to swing back into position and be automatically locked by the spring catch 15.

If, for any reason, it should be desirable to stop the rotation of the spools 10 and 11 to remove particles lodged therebetween, or for other reasons, this may be instantly accomplished by depressing the lever 46 which is in convenient position beneath the finger of the operator.

As changes of construction could be made within the scope of our invention, it is intended that all matter contained in the above description or shown in the accompanying drawings shall be interpreted as illustrative and not in a limiting sense.

For example, plain bearings may be used instead of the ball bearings 28, 34, 49 and 50. Also by making the spring sufficiently weak, slippage in the clutch may be relied upon to enable the picker elements 15 and 17 to stop when held or obstructed for any reason and the clutch lever 46 may, in such case, be dispensed with.

What we claim is:

1. A cotton picker which comprises a pair of parallel spaced spools having continuous smooth edged radial vanes so positioned that the vanes of one spool pass intermediate and spaced at both sides from those of the other when said spools are rotated in opposite directions, means for rotatably supporting said spools, and means for rotating said spools in opposite directions.

2. A cotton picker which comprises a pair of parallel spaced spools having radial vanes, a housing for supporting said spools, a gear for each spool meshing with that of the other spool, a drive shaft entering one end of said housing, a clutch between said shaft and one of said spools, a spring for pressing said clutch into engagement with said spool, and means on the opposite end of said housing to release said clutch.

3. A cotton picker which comprises a pair of parallel spaced spools having longitudinal radial vanes, a housing for supporting said spools, a gear for each spool meshing with that of the other spool, a drive shaft entering one end of said housing, clutches keyed to the shaft at opposite ends of said spools, a spring pressing one clutch against said spools and the latter against the opposite clutch, and a lever having a cam face against said housing and movable on rotation to shift said spring pressed clutch against the action of said spring.

4. A cotton picker comprising a pair of parallel spaced spools having radial vanes and so positioned that the vanes of one spool pass intermediate those of the other when said spools are rotated in opposite directions, a housing for said spools having an opening at one side of the adjacent peripheries of said spools, each of said spools having a gear meshing with that of the other spool, a drive shaft extending longitudinally through one of said spools and freely rotatable therein, a clutch secured to the free end of said shaft, spring means for pressing said clutch towards said spool, and means on said housing to withdraw said clutch against the action of said pressing means.

5. A cotton picker comprising a pair of parallel spaced spools having radial vanes so positioned that the vanes of one spool pass intermediate those of the other spool when said spools are rotated in opposite directions, a housing for said spools having an opening at one side of the adjacent peripheries of said spools, each of said spools having a gear meshing with that of the other, a drive shaft extending longitudinally forwardly through one of said spools, a clutch secured to said shaft at the rear of one of said spools, a clutch secured to said shaft at the opposite end of said spool, spring means for pressing said front clutch towards said spool and said spool towards said opposite clutch, and means at the front of said housing to withdraw said forward clutch against the action of said spring.

6. The apparatus of claim 5 in which said clutch withdrawing means comprises a lever and a cam surface between said lever and said housing.

7. A cotton picker which comprises a pair of parallel spaced spools having radial vanes so positioned that the vanes of one spool pass intermediate those of the other spool when said spools are rotated in opposite directions, a housing for said spools, a shaft entering one end of said housing, a clutch between said spools and said shaft, and a clutch release lever on the opposite end of said housing.

8. A cotton picker which comprises a pair of spaced oppositely rotated spools having radial vanes, the vanes of one spool being so positioned that the vanes of one spool pass intermediate those of the other spool when said spools are rotated in opposite directions, means for rotating said spools, a housing for said spools, a suction chamber, means for hinging said housing to said suction chamber at one side, and a spring latch at the opposite side of said chamber.

9. A cotton picker which comprises a suction chamber having an air inlet opening, an outlet passage and a cotton receiving opening, and a member hinged to said chamber to swing to and from said cotton receiving opening and having means for detaching a lock of cotton and passing it into said chamber.

10. A cotton picker which comprises a housing having cotton picking elements to detach a cotton lock at one side of said housing and to deliver it at the opposite side, and a suction chamber hinged to said housing and having a cotton receiving opening against the delivery side of said picker elements when said chamber and housing are swung to closed position.

11. A cotton picker which comprises a housing having cotton picking elements to detach a cotton lock at one side of said housing and to deliver it at the opposite side, and a suction chamber hinged to said housing and having a cotton receiving opening against the delivery side of said picker elements when said chamber and housing are swung to closed position, said housing having an air inlet to its cotton detaching side and said suction chamber having an air inlet and cotton outlet openings.

12. A cotton picker which comprises a housing having cotton picking elements to detach a cotton lock at one side of said housing and to deliver it at the opposite side, a suction chamber hinged to said housing and having a cotton receiving opening against the delivery side of said picker elements when said chamber and housing are swung to closed position, and a spring catch.

13. A cotton picker which comprises a housing having cotton picking elements to detach a cotton lock at one side of said housing and to deliver it at the opposite side, a suction chamber hinged to said housing and having a cotton receiving opening against the delivery side of said picker elements when said chamber and housing are swung to closed position, and an obliquely transverse strap over the upper wall of said chamber.

14. Apparatus for picking cotton which comprises a chamber having an opening, a pair of spools mounted on spaced axes in said chamber adjacent said opening and having radially projecting smooth, solid vanes mounted radially on said spools and so positioned and spaced that the vanes of one spool pass intermediate and spaced at opposite faces from those of the other spool when said spools are rotated in opposite directions, and means to rotate said spools simultaneously in opposite directions.

15. A cotton picker comprising a chamber having an air inlet and a suction outlet and an opening, a pair of rotating elements having continuous, smooth edged rotating means the means of one element being intermediate and spaced on both sides from those of the other for engaging a cotton boll and throwing it through said opening into said chamber between said air inlet and said outlet, a drive shaft for said rotating elements, and a clutch between said drive shaft and said rotating elements.

16. A cotton picking apparatus which comprises a chamber having an opening, a pair of cotton picking elements in said chamber adjacent said opening, a driving shaft extending forwardly through one of said picking elements, and a clutch connecting said shaft at its forward end to said element.

17. A cotton picker which comprises a pair of parallel rotating elements having continuous smooth edged radial vanes so positioned that the vanes of one rotating element pass intermediate and spaced at both sides from those of the other rotating element when said rotating elements are rotated in opposite directions, means for rotatably supporting said rotatable element, and means for rotating said rotatable elements in opposite directions.

18. A cotton picker which comprises a pair of parallel rotating elements having continuous smooth edged radial vanes so positioned that the vanes of one rotating element pass intermediate and spaced at both sides from those of the other rotating element when said rotating elements are rotated in opposite directions, means for rotatably supporting said rotatable element, means for rotating said rotatable elements in opposite directions, and a chamber supporting said rotating element and in position to receive cotton discharged from between the vanes thereof.

WALLACE R. WILLETT.
HARVEY E. BROWN.